May 10, 1966   S. F. GABRIELS ET AL   3,250,984
WELDER POWER FACTOR AND PHASE SHIFTING CONTROL CIRCUITS
Filed July 8, 1963   2 Sheets-Sheet 1

STANLEY F. GABRIELS
EDWARD J. ZULINSKI
INVENTORS

BY John R. Faulkner
Stuart Lubitz
ATTORNEYS

May 10, 1966 S. F. GABRIELS ET AL 3,250,984
WELDER POWER FACTOR AND PHASE SHIFTING CONTROL CIRCUITS
Filed July 8, 1963 2 Sheets-Sheet 2
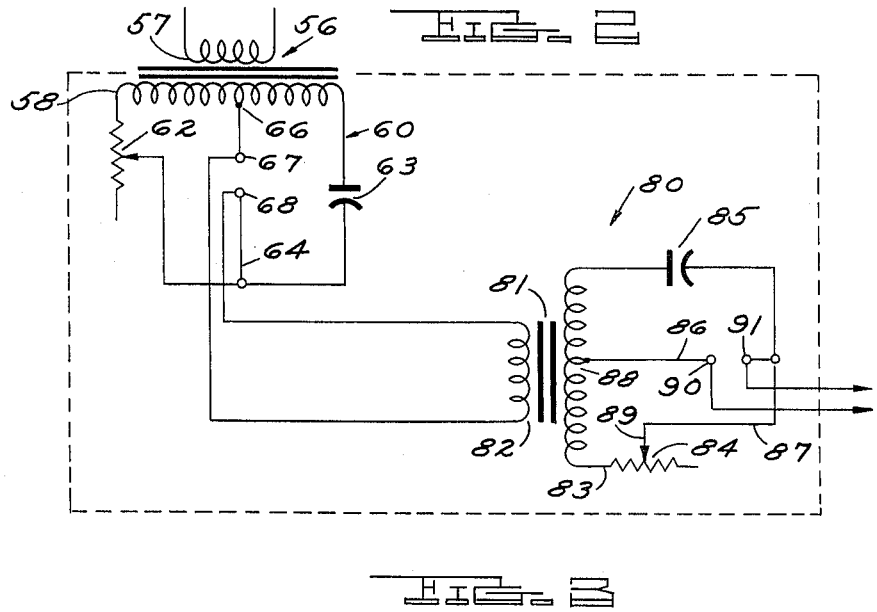
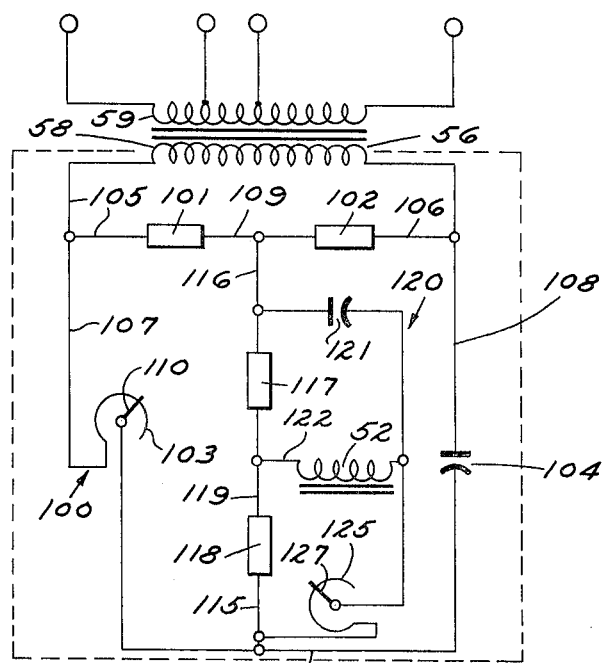
STANLEY F. GABRIELS
EDWARD J. ZULINSKI
INVENTORS
BY John R. Faulkner
Stuart Lubitz
ATTORNEYS ary section 19 is connected to $L_1$, $L_2$ by means of the conductor 24

United States Patent Office 3,250,984
Patented May 10, 1966

3,250,984
WELDER POWER FACTOR AND PHASE SHIFTING CONTROL CIRCUITS
Stanley F. Gabriels, Livonia, and Edward J. Zulinski, Berkley, Mich., assignors to The Ford Motor Company, Dearborn, Mich., a corporation of Delaware
Filed July 8, 1963, Ser. No. 293,368
3 Claims. (Cl. 323—126)

This invention disclosure relates to a power factor control circuit and a phase shifting circuit for a welding machine.

The prior art is redundant with the teaching of a combined phase shifting and power factor control circuit wherein a pair of variable resistors are placed in series. One of the variable resistors is utilized to correct for the power factor while the other variable resistor is utilized to shift the voltage applied to the grid circuit of an ignitron. The ignitron is part of a well-known welding machine control circuit.

In operating these prior art circuits, the power factor variable resistor is usually first adjusted to compensate for the reactance that the welding machine presents to the power source. The reactance which a welding machine presents to the power source will vary from machine to machine and consequently the amount of resistance which must be added to the circuit to correct the power factor will vary depending on the particular machine. With the power factor adjusted, the percentage welding heat may be set by manipulating a knob that controls the second variable resistor. The amount of percent heat adjustment or phase shift that can be accomplished by this manipulation is in part determined by the amount of resistance already in the circuit. Since the amount of resistance present in the control circuit is substantially determined by the setting of the first variable resistor, the amount of phase shift accomplished by each ohm of resistance added by the second variable resistor will be indirectly determined by the particular characteristics of the welding machine. This interaction between the first and second variable resistors and dependence on the reactance of the welding machine that varies from machine to machine prevents any meaningful calibration of the percent heat dial of the welding machine and requires that the machine operator determine the percent heat by experimentation.

One of the main objects of this invention is to overcome the above-mentioned shortcomings by providing a phase shifting circuit that is substantially unaffected by the setting of the variable resistor which corrects the power factor. To this end, one embodiment of the invention provides a first circuit comprising a phase shifting circuit or power factor control circuit that is coupled by a transformer or other means to a second phase shifting circuit for percentage heat adjustment.

Another object of this invention is to provide a percentage heat control having a meaningful visual calibration.

Another object of the invention is the provision of percentage heat control whereby the welding heat can be adjusted with a minimum of experimentation.

These and other objects and advantages will become apparent when the written description is read in conjunction with the drawings wherein:

FIGURE 2 is an electrical schematic of the power factor control circuit and phase shifting circuit; and FIGURE 3 is an alternate embodiment of the power factor control circuit and phase shifting circuit.

Figure 1:
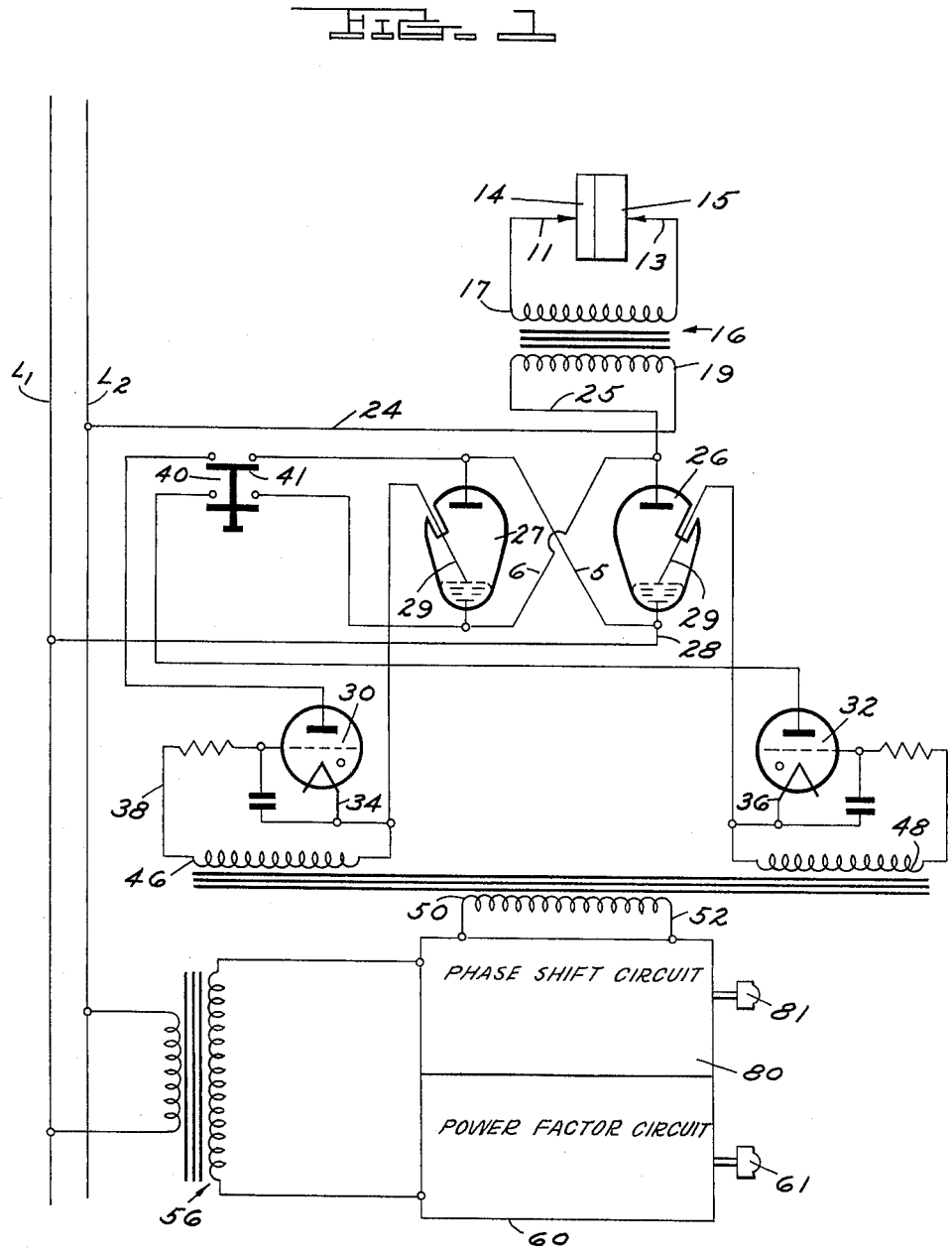
FIGURE 1 is an electrical schematic of a welder control circuit.

Referring to FIGURE 1, reference numerals 11 and 13 indicate a pair of work clamping electrodes of a conventional welding machine. Reference numerals 14 and 15 indicate work pieces held in the respective pairs of electrodes. In accordance with the usual practice, the pairs of electrodes and work pieces held therein are arranged to effect the welding together of the pieces.

A welding transformer 16 has its secondary 17 electrically connected to the electrodes 11 and 13 and is provided with a primary winding 19. The primary section 19 is connected to $L_1$, $L_2$ by means of the conductor 24 and the valves 26 and 27. The valves 26 and 27 are preferably ignitrons which are capable of handling the heavy current normally encountered in welding. These ignitrons 26 and 27 are connected in inverse parallel relation for full cycle operation and, when conducting, they form part of the current path. During a positive half cycle, the current path can be traced from $L_2$ through conductor 24, winding 19, conductor 25, ignitron 26, and conductor 28 to $L_1$. During a negative half cycle current will flow from $L_1$ through conductors 28 and 5, ignitron 27, conductors 6 and 25, winding 19 and conductor 24. Flow through the ignitrons 26 and 27 will only occur if the igniters 29 have been energized. This energization will be explained later in the specification.

To control the extent of suppression of the flux wave in transformer 16 and consequently the root means square value of the current translated to the weld, the ignitrons 26 and 27 are controlled to pass only during predetermined portions of the source current half cycles. This may conveniently be accomplished by employing phase controlled thyratrons 30 and 32 in the ignition circuits for the ignitrons 27 and 26, respectively. A contactor 41 on switch 40 upon closing is adapted to connect the plate circuit of thyratron 30 to the anode of ignitron 27 and similarly connects thyratron 32 to ignitron 26.

The igniters 29 of the ignitrons 26 and 27 are connected in series with the cathodes 34 and 36. The thyratrons 30 and 32 are rendered conductive at predetermined times in the successive half cycles of the alternating current source by potentials induced in secondaries 46 and 48 of a grid control transformer 50. The primary 52 of transformer 50 is energized by the alternating current source $L_1$, $L_2$ via transformer 56, power factor control circuit 60 and phase shifting network 80. A plurality of control elements are provided for the power factor control and phase shifting. The adjustment of one of these elements by the control 61 determines the extent of the power factor correction and the adjustment of another of these elements by the control 81 determines the extent of the phase shift of the voltage supplied to primary 52 and consequently the secondaries 46 and 48 of the grid control transformer. The phase shifting of these transformer voltages controls the conduction of the thyratrons 30 and 32 which in turn determines the time at which the igniters are energized. The time at which the igniters are energized will in part control the amount of heat supplied to the weld.

The above circuitry is well known and does not in itself form an important part of the invention. The theory of operation of this circuitry is considered in detail in the book, Electronic Control of Resistance Welding, by George M. Chute, published in 1943 by McGraw-Hill, Incorporated, pp. 200–208. The novelty of the invented circuitry lies in the arrangement of the power factor control circuit and the phase shifting circuit and in combining these circuits with the remainder of the welder control circuit. The power factor control circuit and the phase shifting circuit are shown in FIGURES 2 and 3.

Referring to FIGURE 2, the power factor control circuit comprises a center tapped transformer 56 having a primary 57 and a secondary 58. One end of the secondary 58 is connected to the variable resistor 62 while the other end of the secondary is connected to a capacitor 63. The center arm of the variable resistor 62 is connected to the capacitor 63 and terminal 68 by the conductor 64. The secondary 58 is center tapped at point 66 and is connected to terminal 67. These terminals 67 and 68 are also connected to the center tapped transformer 81. The center tapped transformer 81 has a primary 82 and a secondary 83. The primary 82 is inductively coupled to the secondary to supply a power factor corrected voltage to the phase shifting circuit 80.

The phase shifting circuit 80 is identical to the power factor control circuit 60. The secondary 83 has one end connected to a variable resistor 84 and its other end connected to the capacitor 85. The conductor 87 connects the center arm 89 of the variable resistor to the capacitor 85 and terminal 91. The secondary is center tapped at point 88 by conductor 86 and is connected to terminal 90. Terminals 90 and 91 are connected to the primary 52 of the grid control transformer.

The circuit shown in FIGURE 2 may be constructed from the following commercially available components or from components having the following values:

Element: Description
Transformer 50
    (FIGURE 1) _____ 115 volt primary, two 230 volt secondaries.
Transformer 56 _____ 115 volt primary, 230 volt center tap secondary.
Transformer 81 _____ 115 volt primary, 230 volt center tap secondary.
Variable resistor 62 ___ 2,000 ohms, 25 watts.
Variable resistor 84 ___ 5,000 ohms, 25 watts.
Capacitor 63 _____ 2 microfarads.
Capacitor 85 _____ 1 microfarad.

In operation the adjustment of the variable resistor 62 will correct for the power factor of the voltage supplied by the primary 82 of the transformer 81. This adjustment of the resistor 62 will not affect the subsequent adjustment of the variable resistor 84. Following the power factor adjustment, the variable resistor 84 may be adjusted in accordance with its calibrations to supply the desired phase shift and consequently the selected amount of heat.

An alternate embodiment of the power factor and phase control circuits is shown in FIGURE 3. This circuit is essentially two bridge circuits connected so that the first circuit acts as a phase shifting or power factor control circuit and supplies the phase shifted voltage to a second phase shifting circuit. More specifically, the first bridge or phase shifting circuit 100 that is connected to a transformer 56 comprises the resistors 101 and 102, the variable resistor 103 and the capacitor 104. The resistors 101 and 102 are connected across the transformer 56 by the conductors 105, 106 and 109. The conductors 105 and 106 are connected to the conductors 107 and 108, respectively. The conductor 107 is connected to one end of the transformer secondary 58 and is connected to the variable resistor 103 that may be adjusted to correct the power factor. The conductor 108 is connected to the other end of the transformer secondary 58 and is connected to the capacitor 104. The capacitor 104 is connected to the center arm 110 of the variable resistor 103 by the conductor 111. The center leg or diagonal of the bridge circuit is connected across conductors 109 and 111 and comprises conductors 115 and 116, resistors 117 and 118 and a conductor 119.

The resistors 117 and 118 and the conductor 119 form part of the second bridge or phase shifting circuit 120. This second phase shifting circuit may be utilized for percentage heat control. The resistor 117 has one end connected to a capacitor 121 and the other end connected to the first end of the transformer primary 52 of the grid control transformer 50. This transformer primary 52 forms part of the center leg 122 of the second phase shift or bridge circuit 120. The resistor 118 has one of its ends connected to the variable resistor 125 and the other end connected to the first end of the transformer primary 52. The center arm 127 of the variable resistor 125 and the capacitor 121 are connected to the second end of the transformer primary 52 thus completing the second phase shifting circuit 120.

The above-described circuit may be constructed from the following components:

Element: Description
Resistor 101 _____ 5000 ohms, 10 watt rating.
Resistor 102 _____ 5000 ohms, 10 watt rating.
Resistor 117 _____ 5000 ohms, 10 watt rating.
Resistor 118 _____ 5000 ohms, 10 watt rating.
Capacitor 104 _____ 2 microfarads.
Capacitor 121 _____ 1 microfarad.
Transformer 50
    (FIGURE 1) _____ 115 volt primary, two 230 volt secondaries.
Transformer 56 _____ 115 volt primary, 230 volt secondary. Alt. 115 volt primary, 115 volt secondary.

The electrical principles of phase shifting control circuits disclosed are well known and explained in Electronic Control of Resistance Welding by George M. Chute, first edition, published by McGraw-Hill, Incorporated, 1943, pp. 208–213 and in U.S. Patent 2,702,365 issued to A. Hyman on February 15, 1955.

In operation the adjustment of the variable resistor 103 will correct the power factor of the voltage supplied by the first phase shifting circuit 100 to the center leg of the bridge circuit 115–116 of the second phase shifting circuit 120. The amount which the resistor 103 is adjusted will not substantially alter the effect that the adjustment of the variable resistor 125 will have on the phase shifting of the voltage supplied by the second phase shifting circuit 120 to the transformer primary 52. This will permit the variable resistor 125 to be adjusted in accordance with the calibrations thereon to supply the desired phase shifted voltage to the secondary of the grid control transformer. The amount of phase shift supplied to the grid control secondary will, of course, control the percentage heat.

It will be understood that the invention is not to be limited to the exact construction shown and described and that various changes and modifications may be made without departing from the spirit and scope of the invention, as defined in the appended claims.

We claim:

1. In a welding control circuit, the combination comprising a first circuit for adjusting the phase relationship of the voltage and current applied thereto, said circuit including a center tapped transformer having a secondary with a first end, a second end and a conductor attached to said center tap, a resistive element in circuit with said first end and said conductor, a reactive element in circuit with said second end and in circuit with said conductor, a pair of terminals in circuit with said conductor and an adjustable means for adjusting the value of one of said elements to thereby alter the phase relationship of the voltage and current at said terminals, and a second circuit for adjusting the phase relationship of the voltage and current supplied to said terminals and for applying the adjusted voltage and current to another portion of the welding control circuit, said second circuit including a second center tapped transformer having a primary winding attached to said terminals and a secondary winding, said secondary winding having a first end and a second end and a conductor attached to said center tap of said transformer, a second resistive element in circuit with said first end and said conductor, a second reactive element in circuit with said second end and in circuit with said conductor, a second pair of terminals in circuit with said conductor and adjustable means for adjusting the value of one of said elements to adjust the phase relationship of the voltage and current at said second terminals, said second terminals connected to another portion of the welding control circuit.

2. In a welding control circuit, the combination comprising a first circuit for adjusting the phase relationship of the voltage and current applied thereto, said circuit including a center tapped transformer having a secondary with a first end, a second end and a conductor attached to said center tap, a resistive element in circuit with said first end and said conductor, a reactive element in circuit with said second end and in circuit with said conductor, a pair of terminals in circuit with said conductor and an adjustable means for adjusting the value of said resistor to thereby alter the phase relationship of the voltage and current at said terminals, and a second circuit for adjusting the phase relationship of the voltage and current supplied to said terminals and for applying the adjusted voltage and current to another portion of the welding control circuit, said second circuit including a second center tapped transformer having a primary winding attached to said terminals and a secondary winding, said secondary winding having a first end and a second end and a conductor attached to said center tap of said second transformer, a second resistive element in circuit with said second end and in circuit with said conductor, a second pair of terminals in circuit with said conductor and adjustable means for adjusting the value of said second resistor to adjust the phase relationship of the voltage and current at said second terminals, said second terminals connected to another portion of the welding control circuit.

3. In a welding control circuit, the combination comprising a first circuit for adjusting the phase relationship of the voltage and current applied thereto, said circuit including a transformer having a secondary with a first end and a second end, a series connected pair of resistive elements in circuit with said first and second ends of said transformer, a reactive element in circuit with said second end, a variable resistor connected to said first end of said transformer, a conductor connecting said variable resistor element and said reactive element, a pair of terminals connected to said conductor and to a point between said pair of resistors and an adjustable means for adjusting the value of said variable resistor to thereby alter the phase relationship of the voltage and current at said terminals, and a second circuit for adjusting the phase relationship of the voltage and current supplied to said terminals and for applying the adjusted voltage and current to another portion of the welding control circuit, said second circuit including a second pair of series connected resistors connected to said terminals, a second variable resistor in circuit with one of said second pair of resistors, a second reactive element in circuit with the other of said second pair of resistors, a second conductor connecting said second variable resistor and said second reactive element, a second transformer in circuit with said second conductor and connected to a point between said second pair of resistors, and adjustable means for adjusting the value of one of said second variable resistors to adjust the phase relationship of the voltage and current at said second transformer.

References Cited by the Examiner
UNITED STATES PATENTS 2,315,602 4/1943 Dawson _____ 323—123
2,806,197 9/1957 Rockafellow _____ 323—119

JOHN F. COUCH, *Primary Examiner.*
LLOYD McCOLLUM, *Examiner.*
A. D. PELLINEN, *Assistant Examiner.*